United States Patent
Meijers et al.

(10) Patent No.: US 12,072,320 B2
(45) Date of Patent: Aug. 27, 2024

(54) NON-CONTACT SYSTEM FOR MONITORING A METALLIC MAGNETIC STRUCTURE UNDER DYNAMIC LOAD

(71) Applicant: TECHNISCHE UNIVERSITEIT DELFT, Delft (NL)

(72) Inventors: Peter Christiaan Meijers, Delft (NL); Apostolos Tsouvalas, Delft (NL); Andrey Vladimirovich Metrikine, Delft (NL)

(73) Assignee: TECHNISCHE UNIVERSITEIT DELFT, Delft (NL)

( * ) Notice: Subject to any disclaimer, the term of this patent is extended or adjusted under 35 U.S.C. 154(b) by 257 days.

(21) Appl. No.: 17/622,381

(22) PCT Filed: Jun. 5, 2020

(86) PCT No.: PCT/NL2020/050366
§ 371 (c)(1),
(2) Date: Dec. 23, 2021

(87) PCT Pub. No.: WO2020/263077
PCT Pub. Date: Dec. 30, 2020

(65) Prior Publication Data
US 2022/0196526 A1 Jun. 23, 2022

(30) Foreign Application Priority Data
Jun. 25, 2019 (NL) .................................. 2023374

(51) Int. Cl.
*G01L 1/12* (2006.01)
*G01B 7/24* (2006.01)
*G01N 3/06* (2006.01)

(52) U.S. Cl.
CPC ................. *G01N 3/06* (2013.01); *G01B 7/24* (2013.01); *G01L 1/125* (2013.01)

(58) Field of Classification Search
CPC ...... G01N 27/82; G01N 27/825; G01N 27/83; G01N 27/84; G01N 27/85; G01N 27/87; G01N 27/90; G01N 3/30; G01N 3/303; G01N 3/307; G01N 3/31; G01N 3/313; G01N 3/317; G01N 3/32; G01N 3/34;
(Continued)

(56) References Cited

U.S. PATENT DOCUMENTS

2002/0190724 A1 12/2002 Plotnikov et al.
2007/0245834 A1 10/2007 Goldfine et al.
(Continued)

FOREIGN PATENT DOCUMENTS

EP    2725253 A2    4/2014

OTHER PUBLICATIONS

International Search Report and Written Opinion; PCT Patent Application No. PCT/NL2020/050366; mailed on Sep. 29, 2020; 9 pages.

*Primary Examiner* — Herbert K Roberts
(74) *Attorney, Agent, or Firm* — AEON Law, PLLC; Adam L. K. Philipp; Charlotte E Holoubek

(57) ABSTRACT

The present invention is in the field of a non-contact system for monitoring a metallic magnetic structure under dynamic load for detecting an impact induced propagating stress wave, and a method of determining strain in a metallic magnetic structure under dynamic load, such as a tube-like structure, such as a monopile for a wind turbine.

18 Claims, 2 Drawing Sheets

(58) Field of Classification Search
CPC .......... G01N 3/36; G01N 3/38; G01N 29/045; G01N 29/046; G01M 7/08; G01B 7/24
See application file for complete search history.

(56) References Cited

U.S. PATENT DOCUMENTS

| | | | |
|---|---|---|---|
| 2014/0182389 A1* | 7/2014 | Dunford | G01M 5/0033 73/779 |
| 2016/0274060 A1* | 9/2016 | Denenberg | G01R 27/02 |

* cited by examiner

NON-CONTACT SYSTEM FOR MONITORING A METALLIC MAGNETIC STRUCTURE UNDER DYNAMIC LOAD

RELATED APPLICATIONS

This application is a U.S. National Phase entry of PCT Patent Application No. PCT/NL2020/050366 having an international filing date of Jun. 5, 2020, which claims priority to Dutch Patent Application No. NL2023374 filed on Jun. 25, 2019. The entire contents of the above-referenced applications and of all priority documents referenced in the Application Data Sheet filed herewith are hereby incorporated by reference for all purposes.

FIELD OF THE INVENTION

The present invention is in the field of a non-contact system for monitoring a metallic magnetic structure under dynamic load for detecting an impact induced propagating stress wave, and a method of determining strain in a metallic magnetic structure under dynamic load, such as a tube-like structure, such as a monopile for a wind turbine.

BACKGROUND OF THE INVENTION

Increasing demand for energy from renewable sources has resulted in a spectacular growth in a number of offshore wind farms on sea, such as in the North Sea. Typically wind turbines in these farms are mounted on large top steel monopiles with diameters ranging up to eight meters and height up to more than 200 m. Typically these thin-walled cylindrical piles are driven into the seabed by hydraulic impact hammers. Due to the large forces exerted at the pile head during pile driving, the structure is prone to plastic deformations. Contact strain measurement techniques are difficult to use at the pile head during pile driving, especially on sea.

Current models of pile driving assume linear elastic material behaviour. However, from practice it is known that plastic deformations occur close to the pile top due to the high stresses in this region. These regions of plastic deformation can have a negative influence on the expected lifetime of the support structure of the offshore wind turbine. Due to the inaccessibility of the pile top during installation, a method to detect the presence of this plastic region from a non-collocated measurement is needed.

When driving piles by hydraulic impact hammers also dynamic strain is introduced into the piles. Real-time measurements of dynamic strain, especially at difficult accessible places, such as at sea, is often not possible. As a consequence, information on the dynamic strain is absent.

EP2725253 A1 recites a device for metallic structure maintenance. The device uses a magneto-graphic/Magnetic Tomography technique to identify stress-related defects. The device is specifically optimized to be used for extended, non-accessible underground and underwater metallic structures in providing quality control, emergency alarms as well as timeline planning for structural repairs and maintenance work. Examples of the use of the device include pipes for oil and gas industry. It is especially important for loaded constructions, such as pressured pipes, infrastructure maintenance, nuclear power plant monitoring, bridges, corrosion prevention and environment protection. The document is considered background art, wherein a magnetic field is used to detect imperfections in magnetic materials.

US 2002/190724 discloses a pulsed eddy current two-dimensional sensor array probe for electrically conducting component inspection includes a drive coil disposed adjacent to a structure under inspection, a pulse generator connected to the drive coil and operable to energize in a pulsed manner the drive coil to transmit transient electromagnetic flux into the structure under inspection, and an array of sensors arranged in a two-dimensional array and substantially surrounded by the drive coil and operable to sense and generate output signals from the transient electromagnetic flux in the structure under inspection.

The present invention therefore relates to a non-contact system and a method of measuring, which solves one or more of the above problems and drawbacks of the prior art, providing reliable results, without jeopardizing functionality and advantages.

SUMMARY OF THE INVENTION

It is an object of the invention to overcome one or more limitations of the devices of the prior art and at the very least to provide an alternative thereto. The invention is also subject of a to be published PhD-thesis by P. Meijers of the Technical University of Delft, which publication and its contents are incorporated by reference thereto.

Here the possibility of using the magnetic field generated by the magnetisation of the ferromagnetic pile to assess the stress state is detailed. The invention relates to a non-contact system for monitoring a metallic magnetic structure under dynamic load for detecting an impact induced propagating stress wave. Experiments have shown that the magnetisation of a ferromagnetic material changes with the applied stress level, even in weak constant magnetic fields, like the Earth magnetic field. Recently, experiments on the magnetic response of a large-scale ferromagnetic thin-walled cylinder under stress were reported by Viana et al. The loading therein, however, was quasi-static, whereas for impact loading the time scales involved are in the order of milliseconds. A numerical model is developed which couples the magneto-mechanical performance to the propagation of mechanical stress waves in the pile. The resulting magnetic field in the air region surrounding the pile is compared to the stress history to show the applicability of the model to assess the stress state due to impact loading. Contrary to prior art considerations it has been found that a magnetic field sensor per se does not provide reliable results, if any. It is required to use an anisotropic magnetic field sensor. As an alternative a giant magneto resistance (GMR) sensor can be used. These are passive sensors, which makes their application beneficial, particularly at high sea. In addition, it is required to use an array of sensors, wherein sensors each individually measure magnetic field resistance. Further, it is required to use a relatively high sampling rate of >10 kHz. The sampling rate is preferably higher, such as >40 kHz, in order to obtain sufficient information. High sampling rates typically imply also sufficient calculating capacity and strong algorithms. At least one array of anisotropic magnetoresistance (AMR) sensors, which sensors are substantially at a same first height, typically in the same plane, is used, wherein sensors are operated at said sampling rate. Details of such sensors can be found in Ripka (ISBN 1-58053-057-5), which book and its contents are incorporated by reference herein. In principle only one sensor would be sufficient, however then only a vertical magnetic field component (Bz) and one horizontal magnetic field component (Br) can be detected. With two sensors, typically spaced opposite of one and another, the horizontal magnetic field component is observed in two parallel horizontal directions, and hence can be determined more accurately. It is however preferred to use at least a third sensor, as then also the second horizontal direction of the magnetic field component can be determined. Each sensor may independently be tilted with respect to the vertical axis, and rotated in the horizontal plane. In order to compensate for e.g. (local) movement of a pile further sensors may be provided. The array of sensors is spaced around the structure and the measurements can take place.

In a second aspect the present invention relates to a method of non-contact monitoring of a metallic magnetic structure under dynamic load, comprising providing the present system, determining the magnetic stray field (typically measured field minus background field), and calculating at least one of plastic strain (also referred to as plastic deformation), and rigid body motion. It has been found that the effect of a dynamic load can be established accurately, as least as accurate as with comparable contact measurements. As the installation of contact sensors is cumbersome, full contact is difficult, if not impossible, such as at sea, the non-contact measurement provides advantages.

The present invention provides a solution to one or more of the above-mentioned problems and overcomes drawbacks of the prior art.

Advantages of the present description are detailed throughout the description.

DETAILED DESCRIPTION OF THE INVENTION

In an exemplary embodiment of the present system the sensors may be evenly spaced around the structure. For instance, in circular mode n sensors are evenly distributed over said circle, and at an angular distance of 360/n°.

In an exemplary embodiment of the present system at least one sensor may be an analogue sensor. It is preferred to use analogue sensors, as these provide high speed. Digital sensors could likewise be envisaged, but these are at the time of writing to the knowledge of the inventors not available with the required characteristics.

In an exemplary embodiment of the present system the array may be spaced in a circular manner.

In an exemplary embodiment of the present system sensors in the array may be synchronized in time and may be in communication with a high-speed data acquisition unit. In order to obtain very accurate information on the stress wave sensors in the array are preferably fully time-synchronized, i.e. operating within exact the same time frame, wherein the time frame may be determined by one single clock, such as a clock of a controller.

In an exemplary embodiment of the present system each sensor may be located at a distance of 1-100 cm from the structure, preferably 5-50 cm, such as 20-30 cm. On sea, said distance is preferably not too small, as compensation for waves (of a supporting system or ship) is difficult. The distance is preferably not too large, as signal strength decreases with distance.

In an exemplary embodiment of the present system at least one further anisotropic magneto resistive sensor, preferably at least one second array of anisotropic magneto resistive sensors, may be provided at a second height, which second height is preferably 10-100 cm above or below the first height. The further sensor and/or array may be similar to the first array.

In an exemplary embodiment of the present system each array may comprise each individually more than 2 sensors, preferably more than 3 sensors, such as 4-10 sensors.

In an exemplary embodiment of the present system each array may comprise a support, such as a ring, on which sensors are attached.

In an exemplary embodiment the present system may comprise a feedback loop, wherein the feedback loop is adapted to increase or decrease a subsequent dynamic load, and/or is adapted to increase or decrease a frequency of subsequent dynamic loads. Such may relate to adapting a number of loads per time (#/min), and/or by adapting an interval between loads.

In an exemplary embodiment of the present method the metallic structure may be selected from a tube-like structure, such as a monopile, such as a monopile for a wind-turbine, a tube for oil or gas production, for off-shore application, for on-shore application, a steel bridge, and combinations thereof.

In an exemplary embodiment of the present method may further comprise determining the geometry of the structure. For accuracy having information on the geometry may be beneficial.

In an exemplary embodiment of the present method may further comprise establishing a magnetic equilibrium status of the structure.

In an exemplary embodiment the present method may comprise providing a calibration. Said calibration may be used to accurately determine the effects of the dynamic load(s).

In an exemplary embodiment of the present method the metallic magnetic structure may comprise a material selected from ferromagnetic material, anti-ferromagnetic material, ferri-magnetic material, and combinations thereof.

In an exemplary embodiment of the present method the metallic magnetic structure may be a tube-like structure, such as a monopile, such as a monopile for a wind turbine, a tube for oil or gas production, for off-shore application, for onshore application, and combinations thereof.

In an exemplary embodiment of the present method a downward moving stress wave may be measured, and a reflected stress wave may be measured.

In an exemplary embodiment of the present method an axial displacement of the structure may be measured.

In an exemplary embodiment of the present method a vertical tangential and/or axial deformation may be measured. In an exemplary embodiment of the present method a sampling rate may be 10-250 kHz, preferably 20-200 kHz, more preferably 40-150 kHz, such as 50-100 kHz.

In an exemplary embodiment of the present method the feedback loop may increase or decrease a subsequent dynamic load, and/or may increase or decrease a frequency of subsequent dynamic loads, and/or may maintain dynamic load and frequency, as described above.

The invention will hereafter be further elucidated through the following examples which are exemplary and explanatory of nature and are not intended to be considered limiting of the invention. To the person skilled in the art it may be clear that many variants, being obvious or not, may be conceivable falling within the scope of protection, defined by the present claims.

DETAILED DESCRIPTION OF FIGURES

Figure 1:
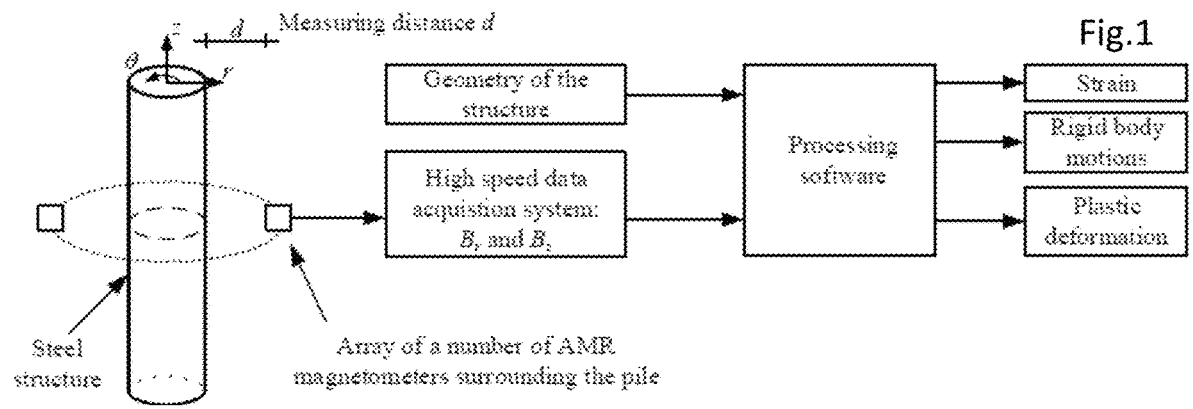
FIGS. 1, 2a-c, and 3a-e show some experimental details.

FIG. 1 shows schematics of the measurements. An array of a number of AMR magnetometers surrounding a pile provided measurement input. Using a high-speed data acquisition system, and having information on the geometry of the pile, which can be obtained or determined in advance, processing software provides information of strain, rigid body motion, and plastic deformation. For calculation a one-dimensional wave propagation model with Rayleigh-Love correction can be used. For the magneto mechanical model Jiles's law of approach can be used.

Figure 2A:
Figure 2B:
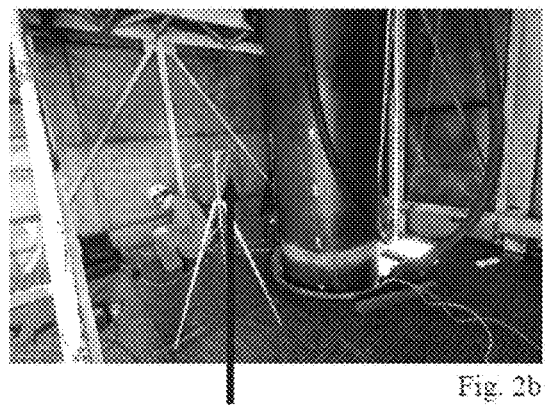
Figure 2C:
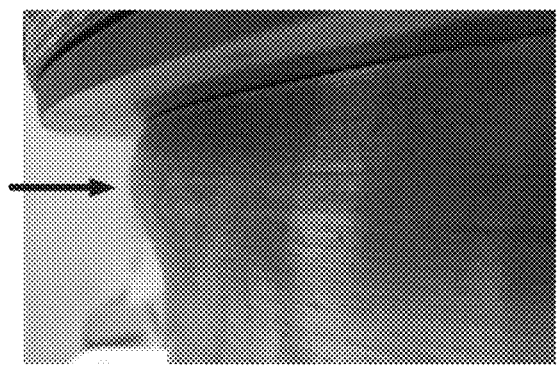

FIG. 2a shows and experimental set-up with the AMR indicated with a solid arrow, and the contact strain sensor with a dashed arrow. The contact monitor is attached to the pile, and the AMR at a distance of about 40 cm. FIG. 2b shows the same set-up and gives an indication of actual sizes. FIG. 2c shows an image, obtained with a camera, of plastic deformation in the pile upon applying a load, indicated with the arrow.

Figure 3A:
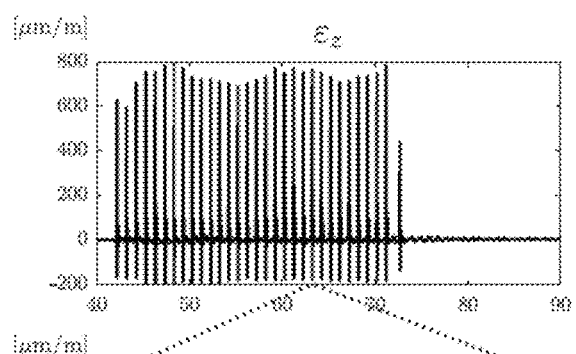
Figure 3A:
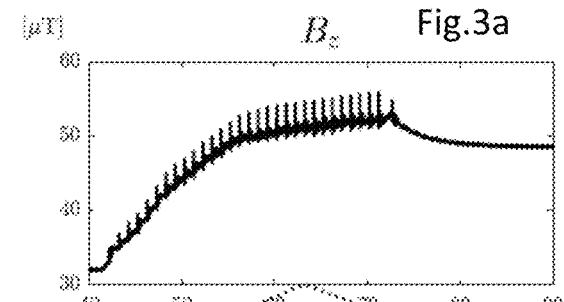
Figure 3B:
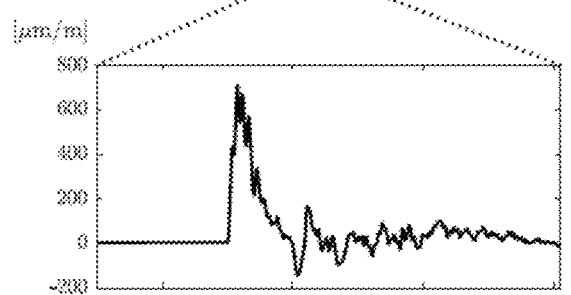
Figure 3B:
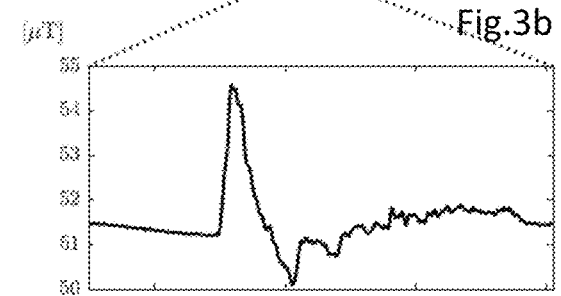
Figure 3C:
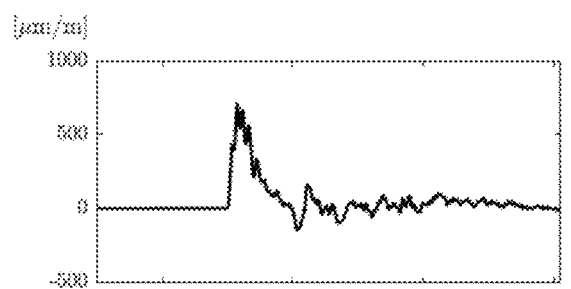
Figure 3C:
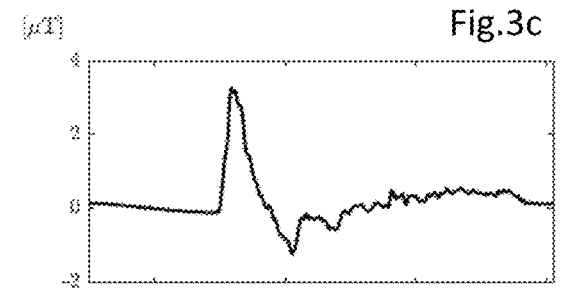
Figure 3D:
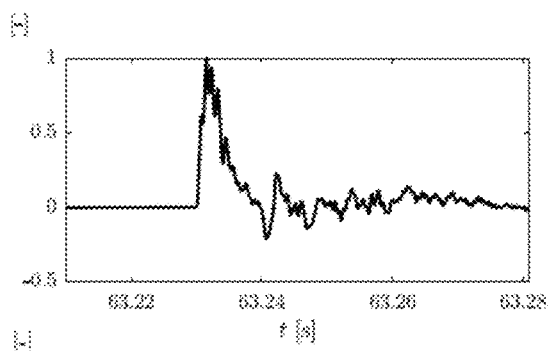
Figure 3D:
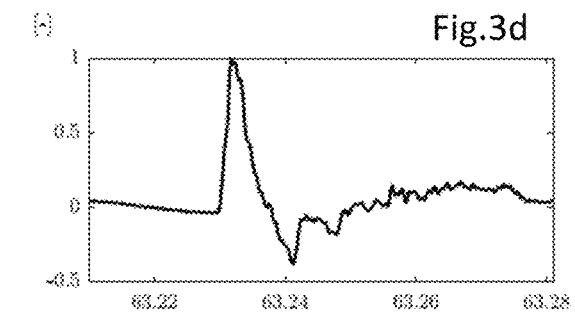
Figure 3E:
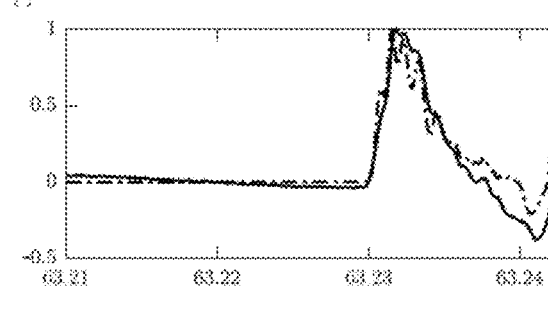
Figure 3E:
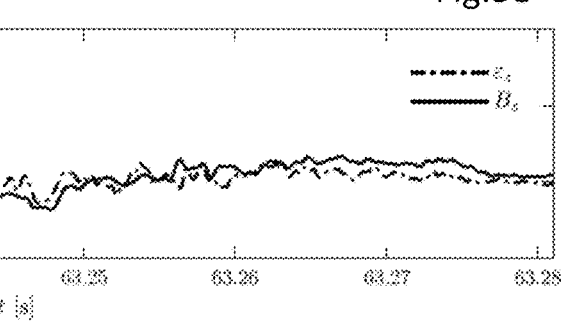

In an example inventors studied the results of dynamic loads. In FIGS. 3a and 3b a series of loads, starting at about 40 seconds, and ending at about 70 seconds was applied and the magnetic field Br [µT] and Bz [µT] were measured. FIGS. 3c and 3d show a blow-up part of the measurements. Further in these figures it can be seen that the results of the non-contact determination and contact-monitoring overlap well. A distance of about 20 cm of the AMR sensor was found appropriate. The lefthand column of FIG. 3 graphs are measured given the axial strain ez), measured in the prior-art way, so with a glued strain gauge. The right column focuses on the axial component of the magnetic field (Bz) measured at 20 cm from the pole. The first row (FIG. 3a) is the full signal; the second row (FIG. 3b) shows an enlargement of every hammer blow; row three (FIG. 3c) shows the deviation of the signal on top of the spot field, so now both signals start at about 0; In row four (FIG. 3d), both signals are normalized by dividing each signal by the peak value. The bottom row (FIG. 3e) combines both normalized signals to show that with the correct scaling (ratio max (ez)/max (Bz)) the signals correspond, and therefore that the elongation can be measured by magnetism.

Experiments have been performed which support the figures and advantageous effects mentioned in the description.

The research on which this patent application is based on research that has been made possible by a grant from NWO in the EUROS (Excellence in Uncertainty Reduction of Offshore wind Systems) program from NWO (#2014/13216/STW).

The invention claimed is:

1. A non-contact system to monitor a metallic magnetic structure, comprising a load providing portion to exert a dynamic load to the structure so as to induce in said structure a propagating stress wave, and further comprising
at least one array of magnetic field sensors, including at least one magneto-resistive sensor the sensors being substantially at a same first height, wherein the sensors are operated at a sampling rate of >10 kHz, the array of sensors is spaced around the structure, and the sensors are configured to measure the propagating stress wave and a rigid body motion of the structure.

2. The non-contact system according to claim 1,
wherein the sensors are evenly spaced around the structure;
wherein at least one sensor is an analogue sensor; and
wherein the array is spaced in a circular manner.

3. The non-contact system according to any of claim 1, wherein sensors in the array are synchronized in time and are in communication with a high-speed data acquisition unit.

4. The non-contact system according to any of claim 1, wherein each sensor is located at a distance of 1-100 cm from the structure.

5. The non-contact system according to any of claim 1, wherein at least one further anisotropic magneto resistive sensor is provided at a second height, which second height is 10-100 cm above or below the first height.

6. The non-contact system according to any of claim 1, wherein each array comprises each individually more than 2 sensors.

7. The non-contact system according to any of claim 1, wherein each array comprises a support on which sensors are attached.

8. The non-contact system according to any of claim 1, comprising a feedback loop, wherein the feedback loop is adapted to increase or decrease a subsequent dynamic load, and is adapted to increase or decrease a frequency of subsequent dynamic loads.

9. A method of non-contact monitoring of a metallic magnetic structure, comprising
providing the system according to any of claim 1,
providing a dynamic load to the structure so as to induce in said structure a propagating stress wave;
determining a magnetic stray field around the structure, and
calculating at least one of plastic strain, and rigid body motion of the structure.

10. The method according to claim 9, wherein the metallic structure is a tube-like structure.

11. The method according to claim 9, further comprising determining a geometry of the structure.

12. The method according to any of claim 9, comprising providing a calibration.

13. The method according to any of claim 9, wherein the metallic magnetic structure comprises a material selected from ferromagnetic material, anti-ferromagnetic material, ferrimagnetic material, and combinations thereof.

14. The method according to any of claim 9, wherein a downward moving stress wave is measured, and wherein a reflected stress wave is measured.

15. The method according to any of claim 9, wherein an axial displacement of the structure is measured.

16. The method according to any of claim 9, wherein a vertical tangential and axial deformation is measured.

17. The method according to any of claim 9, wherein a sampling rate is 10-250 kHz.

18. The method according to any of claim 9, wherein the feedback loop increases or decreases a subsequent dynamic load, and increases or decreases a frequency (#/min, or interval between) of subsequent dynamic loads, and maintains dynamic load and frequency.

* * * * *